United States Patent [19]
Jehle et al.

[11] Patent Number: 5,591,946
[45] Date of Patent: Jan. 7, 1997

[54] FOLDING ACOUSTIC SPEAKER CONTAINER

[75] Inventors: William B. Jehle, Los Angeles; Richard Reus, Anaheim, both of Calif.

[73] Assignee: RJC Designs, Los Angeles, Calif.; a partnership, William B. Jehle & Richard Reus

[21] Appl. No.: 566,543

[22] Filed: Dec. 4, 1995

[51] Int. Cl.⁶ .................................................. H05K 5/00
[52] U.S. Cl. ........................................ 181/141; 381/86
[58] Field of Search ........................... 181/141, 150; 381/86, 87, 88, 90, 188, 205

[56] References Cited

U.S. PATENT DOCUMENTS

| | | | |
|---|---|---|---|
| 4,630,303 | 12/1986 | Tanno | 381/87 |
| 4,696,369 | 9/1987 | Dodrill | 181/141 |
| 5,287,412 | 2/1994 | Etzel et al. | 381/86 |
| 5,321,760 | 6/1994 | Gray | 381/86 |

*Primary Examiner*—Khanh Dang
*Attorney, Agent, or Firm*—William W. Haefliger

[57] ABSTRACT

A speaker box adapted to fit at the rear of a vehicle seat and comprising a box body that is horizontally elongated, has front and rear sides, opposite horizontally spaced ends, a top and a bottom; structure associated with the body to accommodate body swinging between rearward upright position, and forward stowed position, providing storage spaces in both positions; and speaker structure carried by the body to direct sound effectively within the vehicle in each of the body positions.

12 Claims, 3 Drawing Sheets

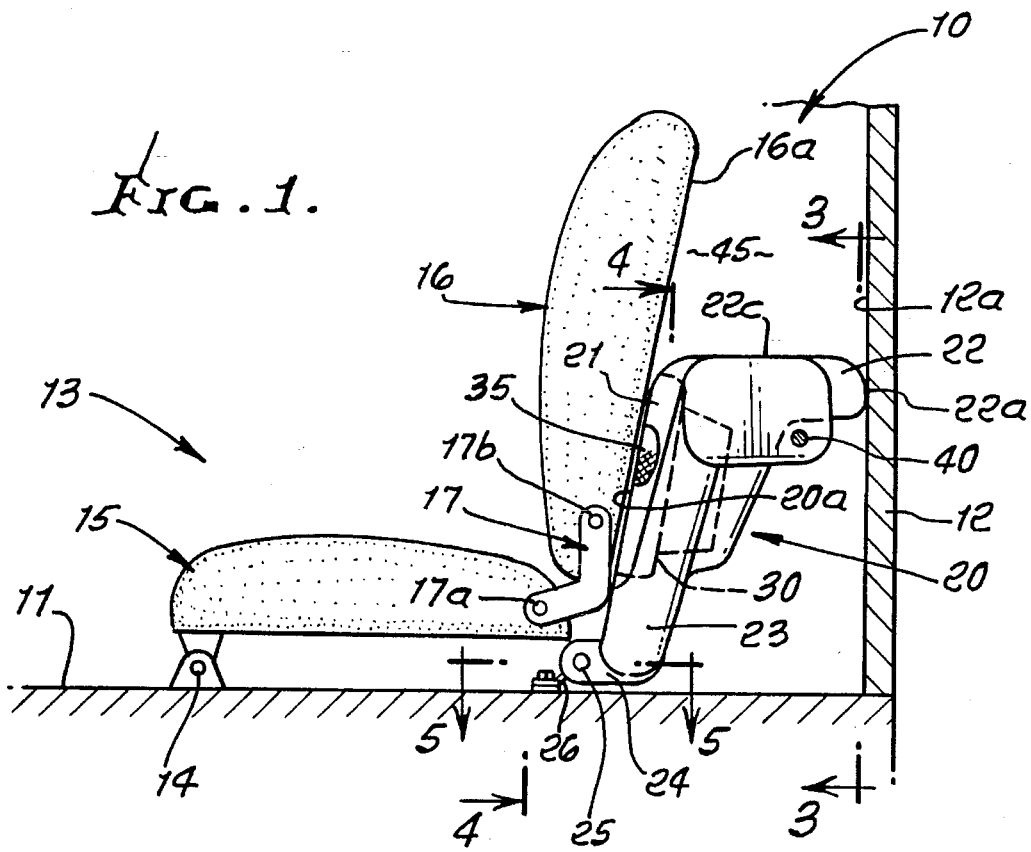
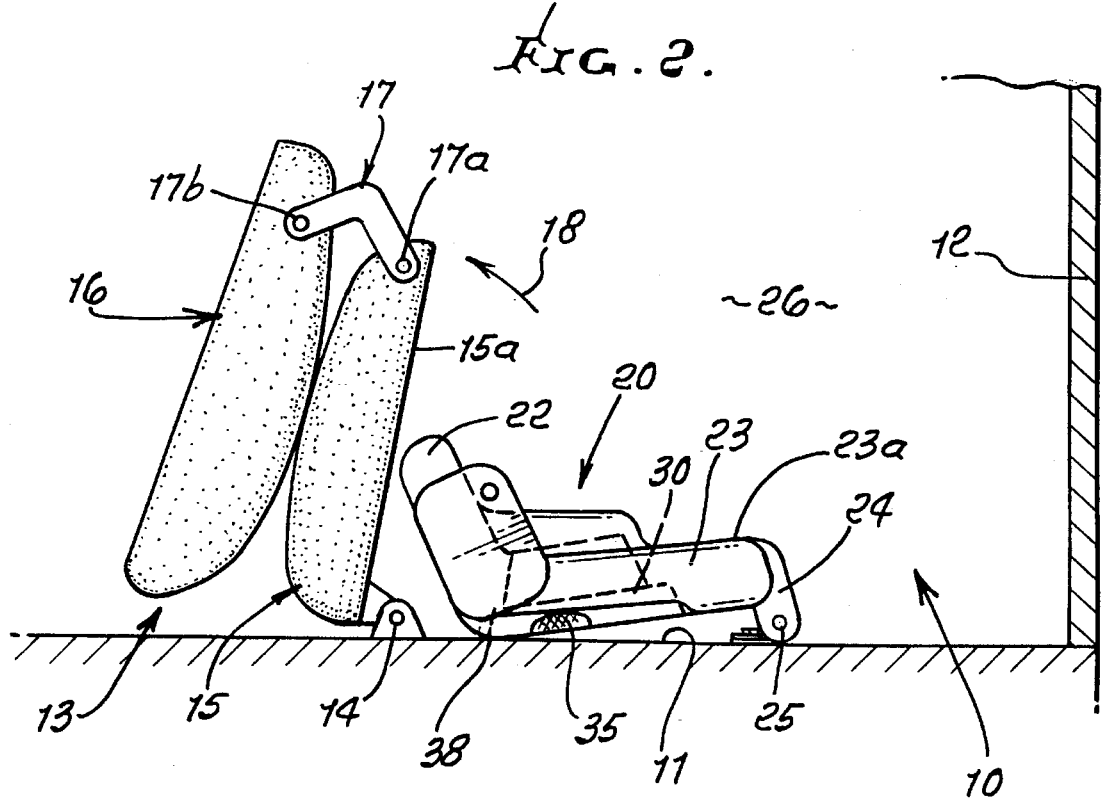

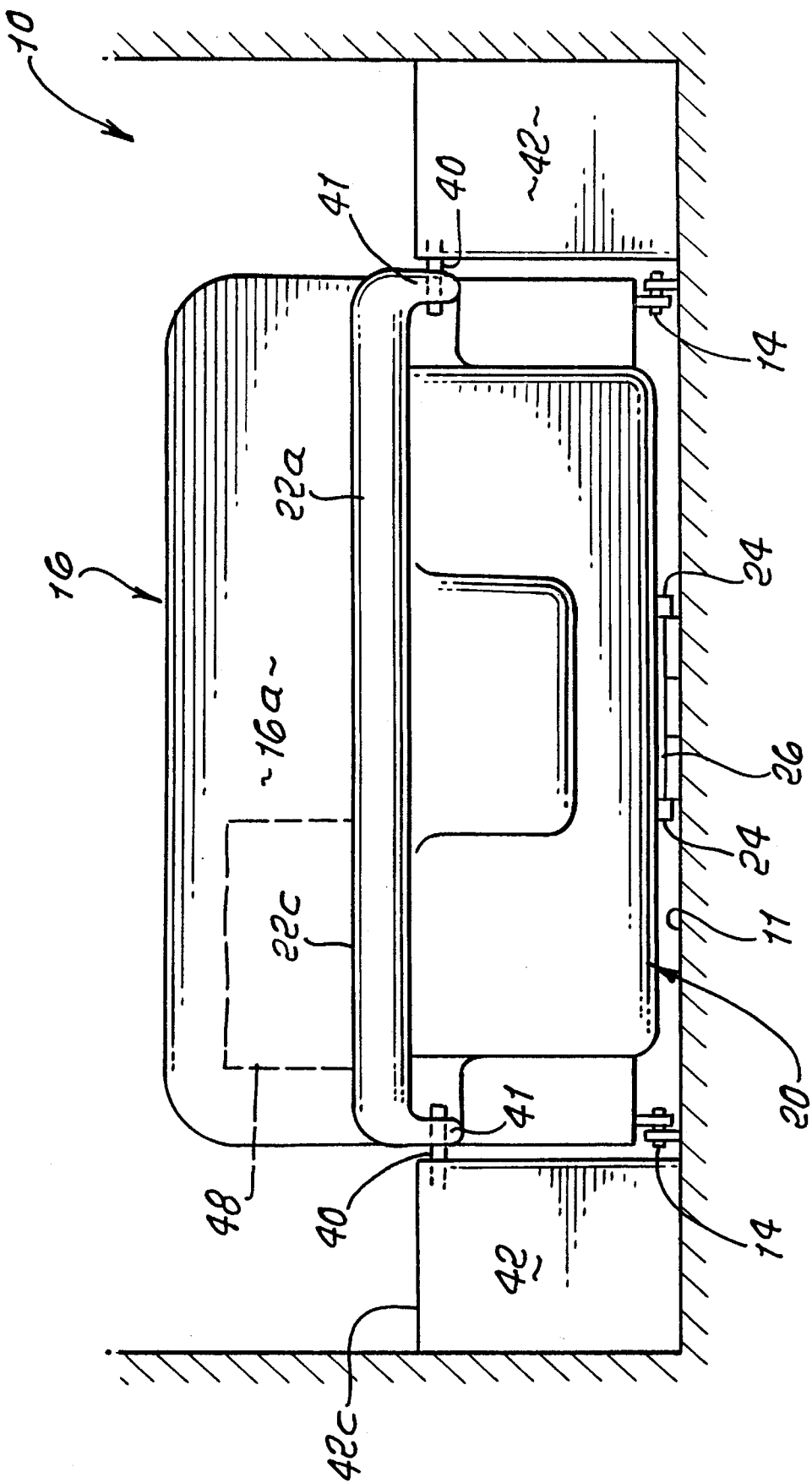

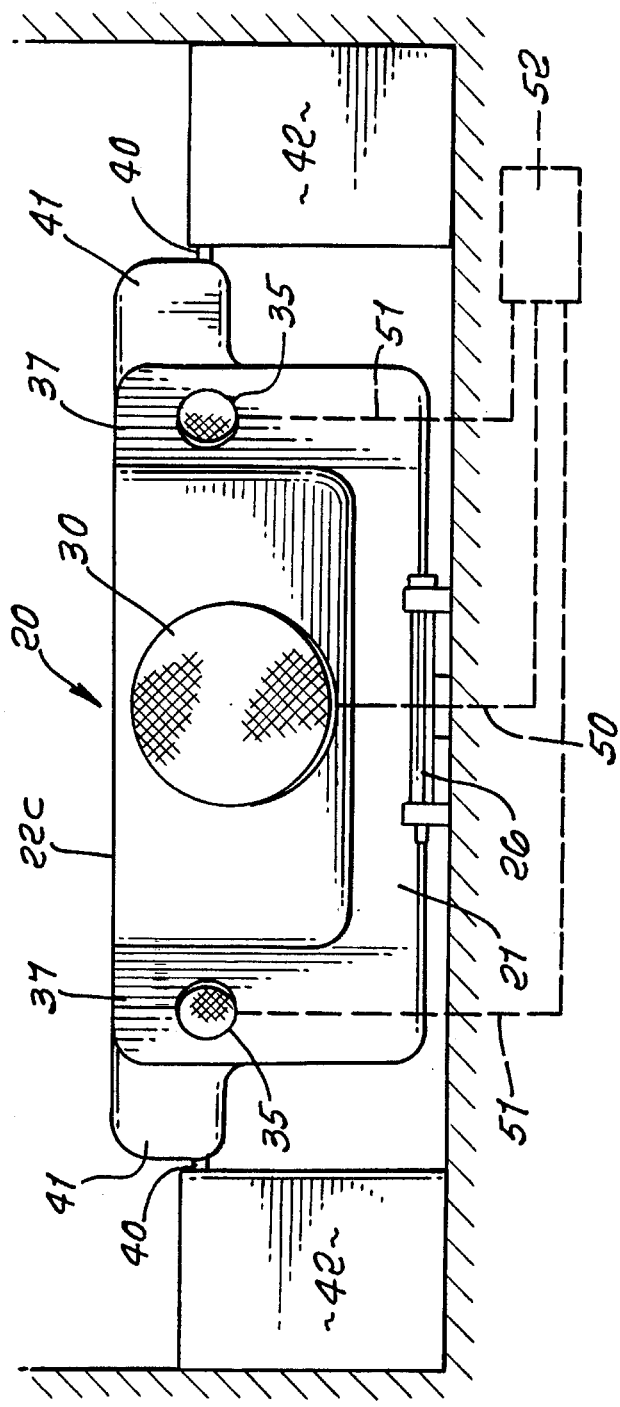
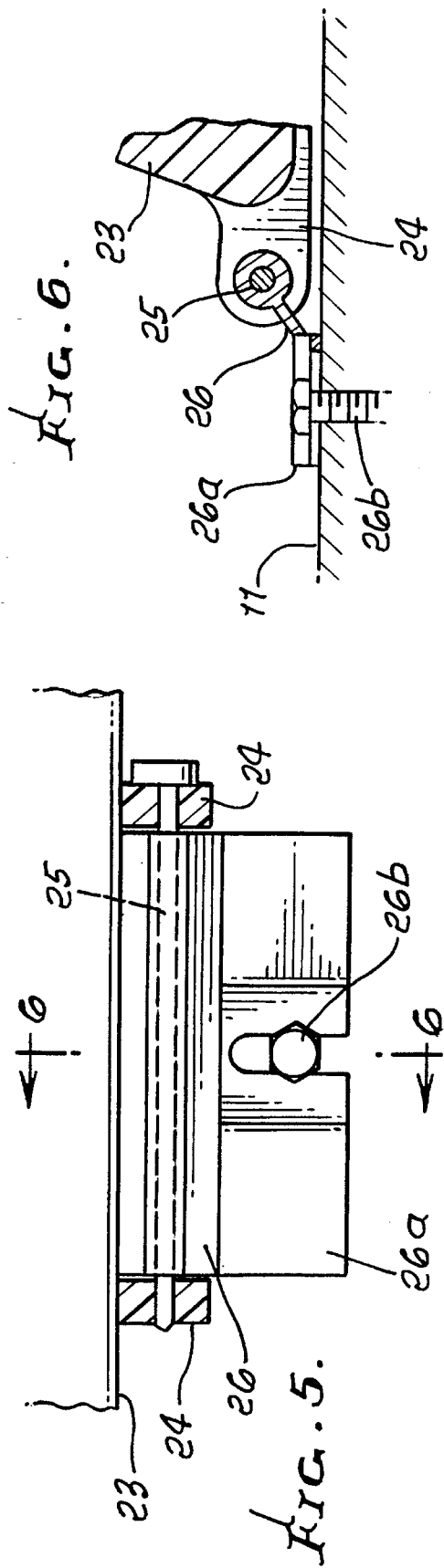

FOLDING ACOUSTIC SPEAKER CONTAINER

BACKGROUND OF THE INVENTION

This invention relates generally to installation of loudspeakers in vehicles; and more particularly, to installation and use of a relatively large speaker cabinet or container in a vehicle, so as not to interfere with luggage loading and transport.

There is need in vehicles for relatively large loudspeaker cabinets or containers, for desired acoustic effects. However, this presents a problem, particularly in small vehicles, such as those frequently used to carry luggage and other equipment. Such large-sized containers occupy needed storage space. There is also need for speaker boxes that can be shifted in a vehicle to alter the acoustics provided by the speakers.

SUMMARY OF THE INVENTION

It is a major object to provide an improved speaker container that is shiftable, while in installed position, to improve storage space in vehicles, such as a utility vehicle. Basically, the improved speaker container or box is adapted to fit at the rear of a utility vehicle seat, and comprises:

a) a box body that is horizontally elongated, has front and rear sides, opposite horizontally spaced ends, a top and a bottom, b) means associated with the body to accommodate body swinging between rearward upright position, and forward stowed position, thereby to provide supportive storage spaces in both positions, c) and speaker means carried by the body to direct sound within the vehicle in each of said body positions.

Another object of the invention includes provision of tweeter, mid range, or other speaker means carried by the body to direct sound forwardly in body upright position, and to direct sound downwardly in the body forward lowered position.

A further object is to locate the speaker means at the body forward side in body upright position.

Yet another object is to provide means attached to the body to accommodate body swinging, including hinge means attached to a lower portion of the body which projects forwardly and downwardly in body upright position. As will be seen, the hinge means or pivot is connected to a vehicle floor panel; and the speaker means is carried by the lower portion of the body, the body having L-shape, to project rearwardly above the vehicle floor panel in body upright position. Latch means is typically carried by a lateral extension of a rearwardly projecting upper extent of the body, to releasably connect to vehicle structure to retain the speaker body in upright position. Extended storage space is thereby provided and for luggage support.

Also, the body may be secured against theft in upright position, by means of one or more concealed locking pins accessible only in body folded position.

A further object includes provision of a vehicle seat directly forwardly of the body, the seat occupying a first position when the body is in the rearward upright position, and the seat occupying a second and forwardly collapsed position when the body is swung to forward lowered position in which the body extends into space at the seat first position. A first pivot structure is typically provided at a relatively rearward location, and there being a second pivot structure attached to the seat, forwardly of the first pivot structure.

A further object includes provision of a plastic molded speaker box designed to fit behind the seat of small sport utility vehicles. When the box is fastened in its upright position, it allows the user to have a secure storage area behind it. When the latch or bolt is removed from the mounting bracket and the box is folded forward, it allows the user to have an unobstructed load area.

These and other objects and advantages of the invention, as well as the details of an illustrative embodiment, will be more fully understood from the following specification and drawings, in which:

DRAWING DESCRIPTION

FIG. 1 is a side elevation showing a speaker box or container installed in a vehicle between a rear wall or tailgate, and the rear side of a seat;

FIG. 2 is a view like FIG. 1 showing the box collapsed forwardly, as the seat is likewise collapsed to provide maximum storage space;

FIG. 3 is a vertical elevation taken on lines 3—3 of FIG. 1;

FIG. 4 is a vertical section taken on lines 4—4 of FIG. 1;

FIG. 5 is an enlarged plan view taken on lines 5—5 of FIG. 1; and

FIG. 6 is an enlarged section taken on lines 6—6 of FIG. 5.

DETAILED DESCRIPTION

In the drawings, a sports utility vehicle 10 has a front panel 11 and a rear wall 12, such as a tailgate. A rear seat structure 13 is located in the vehicle forwardly of wall 12, and typically has pivoted connection at 14 to the floor panel. Structure 13 includes a seat cushion 15 and a back cushion 16 having a frame pivotally connected to the seat cushion frame, as via bracket 17. The latter is shown as connected at 17a to the frame of 15 and at 17b to the frame of 16. This allows the rear seat structure 13 to be forwardly collapsed, as seen in FIG. 2, that view showing the seat structure pivoted counterclockwise at 18 about the horizontal axis of 14. Also, the back cushion 16 is pivoted forwardly to collapse toward 15, as shown, with horizontal pivotal axes at 17a and 17a accommodating such collapse. Other means for allowing forward collapse of the rearward seat structure may be provided.

In accordance with the invention, a hollow speaker box or container 20 is installed, as shown in FIG. 1, between the rear side 16a of 16 and the front side 12a of gate 12. The front side of the box at 21 is angled upwardly and rearwardly to correspond to the rear side angularity of the seat back 16a. Also, the box projects rearwardly at 22 into proximity at 22a to the rear wall 12, providing a flat, upper surface or ledge 22c for supporting luggage in space 45 above 22. Thus, the box takes advantage of the available space, it being desired that a large speaker box be provided for desired acoustical effects. The box projects downwardly at 23 and is connected by a bracket 24 to a horizontal pivot 25. The latter is in turn connected at 26 to the floor panel, whereby the box may be swung between the positions shown in FIG. 1 and FIG. 2 about the horizontal axis of 25.

Note that in FIG. 2 the box projecting extent 22 extends upwardly and forwardly into proximity to the underside 15a of the seat cushion; and the box elongated extent 23 extends generally parallel to the floor panel 11 and in proximity thereto. Thus, projected extent 22 is near gate 12 in FIG. 1, and near the underside of seat cushion 15 in FIG. 2.

Accordingly, the unobstructed storage space 26 between wall 12 and the seat cushion 15 is maximized, as for storage of luggage and other equipment, as enabled by box 20 configuration. In this regard, the upper side 23a of the projected extent 23 of the box extends generally horizontally and parallel to floor panel 11, whereby it provides a flat luggage supporting area, facing upwardly.

The speaker box incorporates woofer speaker means 30 facing forwardly in FIG. 1, and carried by the box to direct sound forwardly in body rearward upright position, as seen in FIG. 1.

In FIG. 2, the woofer 30 faces downwardly toward the floor panel 11, whereby some muffling of the woofer sound is achieved in speaker body forward lowered position, as may be desired for varied acoustical effect.

Also, two tweeter speakers 35, as seen in FIG. 4, are carried by the body laterally of the larger woofer 30, and at laterally sidewardly angled extents 37 of the body, whereby tweeter sound may be directed forwardly in body upright position and toward laterally opposite sides of the seat rear 16a.

Likewise, in box lowered position, the tweeters 35 are spaced above the floor panel 11 and are laterally upwardly angled relative to the front panel, to direct sound laterally and upwardly. Thus, the tweeter sound is not completely muffled, nor is the woofer sound completely muffled in FIG. 2, since the side 20a of the box 20 elongated extent 23 is angled relative to the plane of the floor panel. The speaker box engages the floor panel at 38, forwardly of the tweeters and woofer, whereby the latter are not damaged, but are held raised relative to the floor panel.

Note again in FIG. 1 that the body has general L-shape to project rearwardly at 22. Latch means is carried by that rearward projecting body extent to releasably connect to vehicle structure, as best seen in FIG. 3, thereby to retain the speaker body in upright position. Note, for example, the large pins 40 in FIG. 3 extending between lateral projections 41 associated with the speaker body 20 and a vehicle structure 42 represented by the vehicle wheel wells or housings. Inward retraction of the pins 40 toward the interior of the box releases the box from structures 42 allowing pivoting. Structure 42 has top surfaces 42c providing lateral extensions of ledge 22c, for additional support of luggage, etc., indicated at 48.

FIGS. 5 and 6 show the bracket at 26 having a flat, lower portion 26a connected by a pin 26b to the vehicle floor panel 11.

Unusual advantages of the invention includes those described above, as respects its pivoting, latching, and woofer and tweeter locations in body upright and forward collapsed positions; and that also include ease of installation in and removal from a utility vehicle, as described.

The speaker body is typically made of plastic with or without glass fiber strengthening; and it is normally hollow for desired acoustic effects. Wire for carrying audio signals to the speakers is schematically shown at 50 and 51 in FIG. 4, as connected to a tape deck 52.

Pivots 25 may comprise concealed locking pins accessible only in body folded position, as in FIG. 2. In FIG. 1, pins 25 are concealed.

The box of the invention can be used with a woofer or woofers, with or without mid range and tweeter speakers of any number, and with or without an amplifier attached either inside the box body or surface mounted to the body.

We claim:

1. In a speaker box adapted to fit at the rear of a vehicle seat, the combination comprising:
   a) a box body that is horizontally elongated, has front and rear sides, opposite horizontally spaced ends, a top and a bottom,
   b) means associated with said body to accommodate body swinging between rearward upright position, and forward stowed position, providing storage spaces in both said positions,
   c) and speaker means carried by the body to direct sound effectively within the vehicle in each of said body positions,
   d) said means associated with the body to accommodate body swinging including hinge means attached to a lower portion of the body which projects forwardly and downwardly in body upright position.

2. In a speaker box adapted to fit at the rear of a vehicle seat, the combination comprising:
   a) a box body that is horizontally elongated, has front and rear sides, opposite horizontally spaced ends, a top and a bottom,
   b) means associated with said body to accommodate body swinging between rearward upright position, and forward stowed position, providing storage spaces in both said positions,
   c) and speaker means carried by the body to direct sound effectively within the vehicle in each of said body positions,
   d) and wherein said speaker means is located to direct sound forwardly in said body upright position, and to direct sound downwardly in said body stowed position.

3. The combination of claim 1 wherein said speaker means includes a speaker located at said body front side in body upright position.

4. The combination of claim 1 wherein said hinge means projects forwardly of lowermost extent of said body.

5. The combination of claim 1 including a vehicle floor panel to which said hinge means is connected.

6. The combination of claim 5 wherein said speaker means includes a speaker carried by said lower portion of the body, the body having L-shape, to project rearwardly above the vehicle floor panel in body upright position.

7. The combination of claim 1 wherein the body in said forward stowed position is lowered relative to said body upright position.

8. In a speaker box adapted to fit at the rear of a vehicle seat, the combination comprising:
   a) a box body that is horizontally elongated, has front and rear sides, opposite horizontally spaced ends, a top and a bottom,
   b) means associated with said body to accommodate body swinging between rearward upright position, and forward stowed position, providing storage spaces in both said positions,
   c) and speaker means carried by the body to direct sound effectively within the vehicle in each of said body positions,
   and wherein said body has a portion which projects rearwardly in body upright position, there being latch means including pin means carried by said body to releasably connect to vehicle structure to retain the body in upright position, whereby said portion has an upper surface to support luggage.

9. In a speaker box adapted to fit at the rear of a vehicle seat, the combination comprising:

a) a box body that is horizontally elongated, has front and rear sides, opposite horizontally spaced ends, a top and a bottom, b) means associated with said body to accommodate body swinging between rearward upright position, and forward stowed position, providing storage spaces in both said positions, c) and speaker means carried by the body to direct sound effectively within the vehicle in each of said body positions, d) and including a vehicle seat directly forwardly of said body, said seat occupying a first position when said body is in said rearward upright position, and said seat occupying a second and forwardly collapsed position when said body is swung to forward stowed position in which the body extends into space at said first position.

10. The combination of claim 9 wherein said means to accommodate body swinging includes a first pivot structure at a relatively rearward location, and there being a second pivot structure attached to the seat, forwardly of said first pivot structure.

11. The combination of claim 10 wherein the body in said forward stowed position is lowered relative to said body upright position.

12. The combination of claim 10 wherein said first pivot structure includes pivot means concealed in body upright position and accessible in body stowed position.

* * * * *